United States Patent [19]

Blaich

[11] Patent Number: 4,887,785
[45] Date of Patent: Dec. 19, 1989

[54] HANGER HOOK

[76] Inventor: Ilga E. Blaich, 17 Pond Hollow, Hamden, Conn. 06518

[21] Appl. No.: 233,809

[22] Filed: Aug. 19, 1988

[51] Int. Cl.[4] .............................................. F16B 45/00
[52] U.S. Cl. .................................... 248/339; 248/304; 24/230.5 AD
[58] Field of Search ............... 248/304, 301, 302, 339, 248/340, 211, 290, 294, 308; 24/230.5 AD, 230.5 R, 230.5 W, 370, 373, 230.5 TP

[56] References Cited

U.S. PATENT DOCUMENTS

| | | | |
|---|---|---|---|
| 1,375,724 | 4/1921 | Oponiak et al. | 24/230.5 R |
| 1,616,013 | 2/1927 | Warren | 24/230.5 R |
| 1,762,750 | 6/1930 | Weissman et al. | 24/230.5 R |
| 1,907,529 | 5/1933 | Faure-Roux | 24/230.5 R |
| 3,374,620 | 3/1968 | Gower | 24/370 X |
| 3,718,947 | 3/1973 | Huber | 24/370 X |
| 4,123,900 | 11/1978 | Sadowski | 24/230.5 W X |
| 4,646,396 | 3/1987 | Geese | 24/230.5 R |

FOREIGN PATENT DOCUMENTS 1188738  9/1959  France ................................. 24/373

Primary Examiner—Ramon S. Britts
Assistant Examiner—Karen J. Chotkowski
Attorney, Agent, or Firm—Richard A. Craig

[57] ABSTRACT

A hanger hook is of modified S shape and all parts of the hanging hook lie substantially in the same plane. The hook has utility particularly but not exclusively in hanging a birdfeeder from a substantially horizontal tree branch and the like. The hook has a lower open loop providing a bite for receiving thereover the circular portion of a birdfeeder or plant hanger. The hanger also has an upper open loop for receiving the branch. The hook resists efforts of squirrels, raccoons, or the like but not people to disassemble the hanger from the hook and to disassemble the hook from the branch.

13 Claims, 2 Drawing Sheets

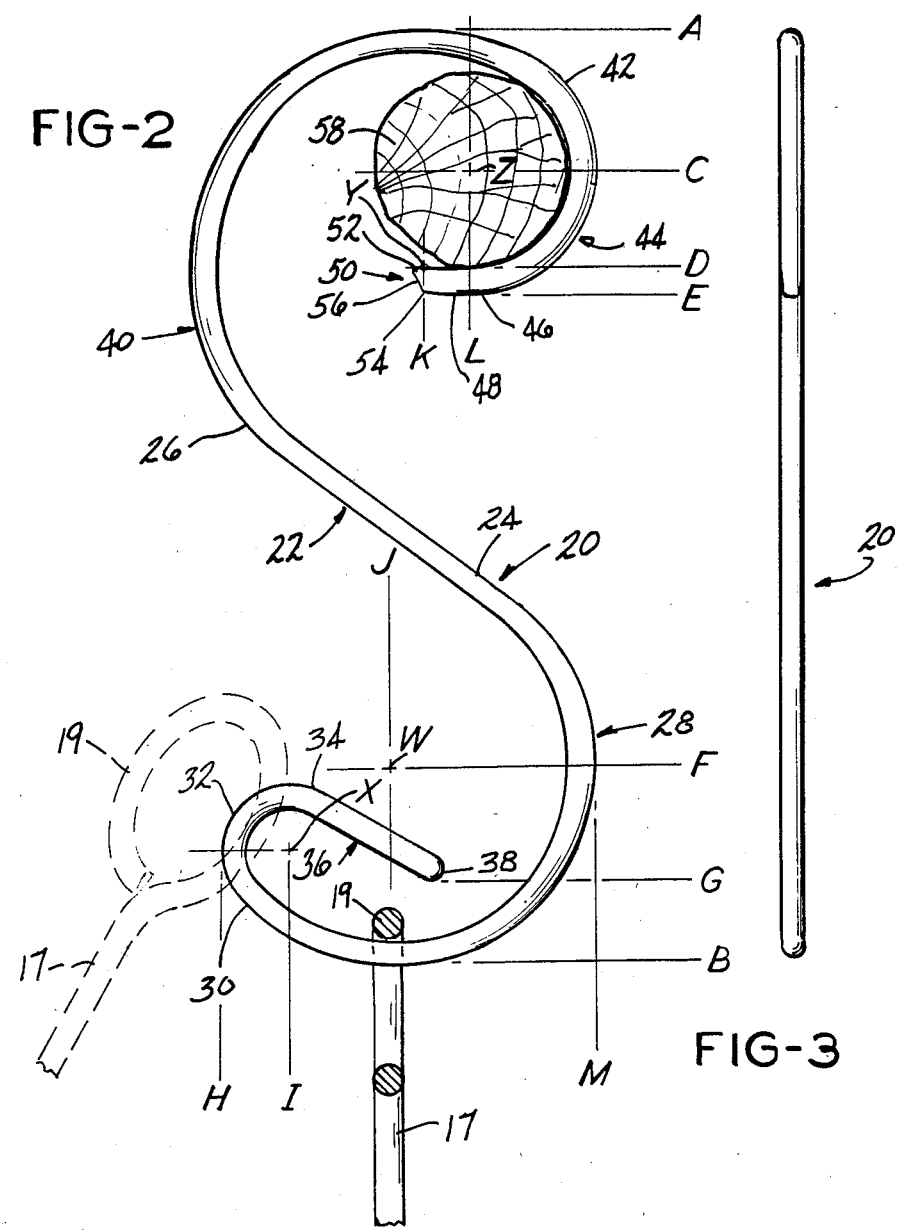

4,887,785

HANGER HOOK

BACKGROUND OF THE INVENTION

This invention relates to a hanger hook which has particular utility for hanging a birdfeeder, particularly a birdfeeder of the type disclosed in Clarke U.S. Pat. No. 4,223,132 issued May 25, 1982, the disclosure of which is incorporated herein by reference. However, the utility of the inventive hook is not limited to hanging a birdfeeder. Another use would be for hanging plants in baskets, for example, from tree branches.

A birdfeeder according to the Clarke patent is highly resistant to attempts by squirrels to gain access to seed therein. It has been found that squirrels pick up the challenge of attempting to gain entry into the feeder. Sometimes this attempt takes the form of an effort to dislodge the feeder from its moorings so as to cause it to drop to the ground.

It is an important object of the present invention to provide a simple hook for hanging a bird feeder or other device from a tree branch or similar extension in extremely simple fashion.

It is an important object to provide a simple hook for hanging the feeder, planter, and the like from a tree branch in such a manner that the efforts of squirrels, raccoons, and the like to disassemble or dislodge the birdfeeder hanger from the hook or the hook from the branch will be effectively thwarted.

It is another important object of the invention to provide a simple hook which is hangable from a tree branch in extremely simple fashion, and which is easily removable, but not by squirrels, raccoons, and the like.

It is a further important object of the invention to provide a simple hook which, while hanging form a branch as aforesaid, can easily have a birdfeeder hung therefrom in such fashion that the birdfeeder can easily be removed from the hanger, but not by a squirrel, a raccoon, and the like. It is still another important object of the invention to provide a plurality of simple hooks for hanging the feeder from tree branches or other extensions having diameters of about 2 inches (5.1 cm), or about 1.5 inches (3.8 cm) or about 1 inch (2.5 cm).

The foregoing and additional objects and advantages will appear hereinafter.

SUMMARY OF THE INVENTION

A hanger hook of the invention is of modified S shape and all parts of the disclosed examples thereof lie substantially in the same plane. The hook has utility particularly but not exclusively in hanging a birdfeeder from a substantially horizontal tree branch, but its utility is not limited thereto. The hook has a lower open loop providing a bite for receiving thereover the circular portion of a birdfeeder hanger. The hook also has an upper open loop for receiving the branch. The hook resists efforts of squirrels but not people to disassemble the hanger from the hook and to disassemble the hook from the branch. Significant parameters are developed hereinafter.

DESCRIPTION OF THE DRAWINGS

FIG. 2 is an elevational view of a hanger hook embodying the invention; and

FIG. 3 is an edge view of the hook of FIG. 2 as seen from the right of FIG. 2.

DESCRIPTION OF THE INVENTION

Figure 1:
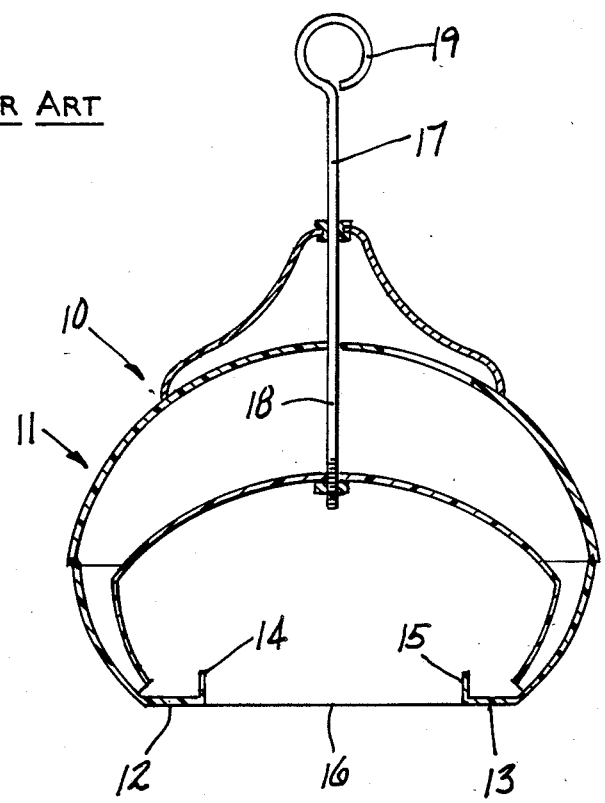
FIG. 1 is an axial sectional view of a commercial form of a birdfeeder of the type shown in the aforementioned prior U.S. Pat. No. 4,223,132.

FIG. 1 shows a birdfeeder 10 which is a preferred commercial form of the type shown in prior U.S. Pat. No. 4,223,132. Birdfeeder 10 includes a body portion comprising an assembly of three transparent plastic parts, namely, a bottom member, an inner arch and a dome. The inner arch is within the dome and is secured thereto in known fashion. The assembly of the inner arch and the dome is assembled with the bottom member and secured thereto in known fashion. The space between the inner arch and the dome provides a seed reservoir. The dome has a feed filling port near its axis.

The inner arch has lower free ends, and the bottom member further has coplanar floors or birdfeeding trays 12 and 13 which are spaced below the lower free ends of the inner arch. Walls 14 and 15 extend upwardly from the inner edges of floors 12 and 13, respectively, and are spaced inwardly from the free ends of the inner arch. Walls 14 and 15 are spaced from each other and the space therebetween provides a fly up entry 16 whereby birds can enter birdfeeder 10, perch on the tops of walls 14 and 15 and eat seeds on trays 12 and 13. As this happens, new seed proceeds by gravity from the reservoir to trays 12 and 13.

Birdfeeder 10 also includes a bell shaped metallic cover with a skirt portion and a metallic hanger 17. The dome has an axial hole therethrough and the inner arch has a hole therethrough, spaced from and aligned with the dome hole. Likewise, the cover has a hole therethrough.

Hanger 17, which is made of a metal (cadmium plated steel, for example) rod about 0.25 inch (0.6 cm.) in diameter, has a straight portion 18 with external threads at one end and a circular portion 19 at the other end. The total length of hanger 17 is about 14.25 inches (39.2 cm) and the inside diameter of circular portion 19 is about 1.5 inches (3.8 cm). Straight portion 18 of hanger 17 passes through the holes in the inner arch, the dome and the cover with circular portion 19 thereabove. A nut within the inner arch engages the external threads of hanger 17.

FIGS. 2 and 3 show a hanger hook 20 which is a preferred embodiment of the invention. Like hanger 17, hanger hook 20 is formed of a metal (cadmium plated steel, for example) rod about 0.25 inch (0.6 cm) in diameter. The metal rod of which hook 20 is formed is about 24 inches (61.0 cm) long.

Hook 20 is of a modified S shape, all parts of which are substantially coplanar as shown in FIG. 3. Hook 20 will be described with reference to upper and lower horizontal reference lines A and B which are spaced apart about 9.5 inches (24.1 cm) and intermediate horizontal reference lines C, D, E, F and G and with reference to vertical reference lines H, I, J, K and M.

Hook 20 has a straight central portion 22 about 3 inches (7.6 cm) long and which makes an angle of about 37 degrees with line F but does not intersect horizontal reference line F or any other horizontal reference line. Portion 22 has a lower end 24 and an upper end 26 and portion 22 is substantially bisected by vertical reference line J. Hook 20 further has a lower main arcuate portion 28 which is tangential to central portion 22 at lower end 24 thereof.

Arcuate portion 28 is struck about a center of curvature W and has an inside diameter of about 3.75 inches (9.5 cm) or a radius of about 1.875 inches (4.8 cm). Center W lies on vertical reference line J, and also on horizontal reference line F which is located about 2.125 inches (5.4 cm) above horizontal reference line B.

Lower main arcuate portion 28 extends from end 24 of central portion 22 about 193 degrees to an end 30 remote from end 24. Arcuate portion 28 is externally tangential to vertical reference line M and to horizontal reference line B at its point of intersection with vertical reference line J. End 30 is on the opposite side of vertical reference line J from vertical reference line M.

Hook 20 further has a lower auxiliary arcuate portion 32 which is tangential to main arcuate portion 28 at end 30 thereof. Lower auxiliary arcuate portion 32 is stuck about a center of curvature X which is located on vertical reference line I which is about 1.125 inches (2.9 cm) from vertical reference line J and on the opposite side thereof from vertical reference line M. Vertical reference line M is about 3.25 inches (8.3 cm) from vertical reference line I.

Center of curvature X is located about 1.375 inches (3.5 cm) from center of curvature W and about 1.25 inches (3.2 cm) above horizontal reference line B. Auxiliary arcuate portion 32 has an inside diameter of about 0.875 inch (2.2 cm) or a radius of about 0.4375 inch (1.1 cm) and extends from end 30 to an end 34. The arcuate extent of arcuate portion 32 is about 160 degrees.

Hook 20 also has a lower straight portion 36 overlapping and spaced form main arcuate portion 28 and tangential to auxiliary arcuate portion 32 at end 34 thereof and extending across vertical reference line J and making an angle of about 30 degrees with horizontal reference line F and about 60 degrees with vertical reference line J. Lower straight portion 36 is about 1.5 inches (3.8 cm) long and terminates at a rounded free end 38 which is one end of the rod of which hook 20 is fabricated. Rounded end 38 is spaced varying distances from main arcuate portion 28 in various directions. The minimum such distance is about 0.5625 inch (1.4 cm) in a direction substantially parallel to vertical reference line J. Also, rounded end 38 is tangential to horizontal reference line G which is spaced about 0.875 inch (2.2 cm) above lowermost horizontal reference line B. Arcuate portions 28 and 32 and lower straight portion 36 provide hook 20 with a bite, the purpose of which will appear.

The maximum external distance between lower straight portion 36 and lower main arcuate portion 28 is about 1.1875 inches (3.0 cm), which is slightly less than the inside diameter of circular portion 19 of hanger 17, so that circular portion 19 may be passed over the bite presented by arcuate portions 28 and 32 and straight portion 36.

Hook 20 further has an upper main arcuate portion 40 which is tangential to straight central portion 22 at upper end 26 thereof and extends therefrom to an end 42. Arcuate portion 40 is struck about a center of curvature Y which is located on horizontal reference line D and vertical reference line K. Horizontal reference line D is spaced above horizontal reference line F about 5.0625 inches (12.9 cm). Vertical reference line K is offset about 0.3125 inch (0.8 cm) from vertical reference line J in the direction such that vertical reference line K is between vertical reference line J and vertical reference line M. The inside diameter of upper main arcuate portion 40 is about 4.25 inches (10.8 cm) or a radius of about 2.125 inches (5.4 cm) and main arcuate portion 40 is about 180 degrees in arcuate extent. Also, arcuate portion 40 is tangential to horizontal reference line A at its location of intersection with vertical reference line K.

Hook 20 additionally has an upper auxiliary arcuate portion 44 which is tangential to upper main arcuate portion 40 at end 42. Arcuate portion 44 is struck about a center of curvature Z which is located on horizontal reference line C and on vertical reference line L. Horizontal reference line C is spaced about 1.375 inches (3.5 cm) below horizontal reference line A. The inside diameter of upper auxiliary arcuate portion 44 is about 2.0 inches (5.1 cm) or radius of 1.0 inch (2.5 cm), and portion 44 extends from end 42 to an end 46 which is on vertical reference line L which is spaced about 0.5625 inch (1.4 cm) from vertical reference line K in the direction such that vertical reference line L is between vertical reference lines K and M.

It is also to be noted that upper auxiliary arcuate portion 44 is externally tangential to vertical reference line M, as is lower main arcuate portion 28.

Finally, hook 20 has an upper straight portion 48 which is tangential to upper auxiliary arcuate portion 44 at end 46 thereof internally along horizontal reference line D and externally along horizontal reference line E which is located about 2.625 inches (6.7 cm) below horizontal reference line A. Upper straight portion 48 is thus horizontal and terminates at a beveled free end 50 which is the other end of the rod of which hook 20 is fabricated.

More particularly, upper straight portion 48 extends internally along horizontal reference line D across vertical reference line K to a rounded tip 52 which is spaced about 2.0 inches (5.1 cm) from the internal intersection of horizontal reference line D and upper main arcuate portion 40. Upper straight portion 48 extends externally along horizontal reference line E to a point 54 just short of vertical reference line K. Rounded tip 52 and point 54 are joined by a beveled surface 56 which is inclined at an angle of about 37 degrees with respect to horizontal reference line D and which confronts that part of straight central portion 22 that is adjacent upper end 26 thereof and is parallel thereto and spaced about 2.0 inches (5.1 cm) therefrom.

Lower main arcuate portion 28, lower auxiliary arcuate portion 32 and lower straight portion 36 provide hook 20 with a lower open loop, while upper main arcuate portion 40, upper auxiliary arcuate portion 44 and upper straight portion 48 provide hook 20 with an upper open loop.

Hook 20 can easily be suspended from a generally horizontal tree branch 58 having a diameter of about 2 inches (5.1 cm) by passing the upper open loop over the branch, and simultaneously rotating hook 20 about branch 58. Hanger 17 (with the rest of birdfeeder 10 assembled therewith), can then be suspended by circular hanger portion 19 from hook 20 by passing from the lower open loop by passing circular hanger portion 19 over the bite presented by lower main arcuate portion 28, lower auxiliary arcuate portion 32 and lower straight portion 36, as indicated in fragmentary phantom in FIG. 2, and moving portion 19 along lower straight portion 36 until portion 19 clears free end 38. Portion 19 is then traversed only by lower main arcuate portion 28, as indicated by the full line fragmentary showing of portion 19 in FIG. 2. This completes the hanging of feeder 10 from hook 20 and hook 20 from branch 58.

Squirrels, or raccoons or the like attempting to gain access to seed in birdfeeder 10 will be unable to (a)

disassemble hanger 17 from hook 20 or (b) disassemble hook 20 from branch 58 because they will not be able to rotate the hook and the branch or the like. Success in either of these ventures would cause birdfeeder 10 to crash to earth where most likely the seed holding components would shatter, spewing seed on the ground. If by some miracle birdfeeder 10 should survive the fall intact, it would still be a simple matter for the squirrel to enter fly in opening 16 and thereby reach the seed.

Modified forms of hook 20 may be provided for installation on branches of other diameters than branch 58. Thus, for a branch having a diameter of about 1.5 inch (3.8 cm), hook 20 may be provided with its upper main arcuate portion 40 having an inside diameter of about 3.25 inch (8.3 cm) and its upper auxiliary arcuate portion 44 having an inside diameter of about 1.5 inches (3.8 cm), and for a branch having a diameter of about 1.0 inch (2.5 cm), hook 20 may be provided its upper main arcuate portion 40 having an inside diameter of about 2.25 inch (5.7 cm) and its upper auxiliary arcuate portion 44 having an inside diameter of about 1.0 inch (2.5 cm). Also, for hook 20 for use with a branch having a diameter of about 1.5 inches (3.8 cm), upper free end 50 is spaced about 1.5 inches (3.8 cm) from central portion 22, and for hook 20 for use with a branch having a diameter of about 1.0 inch (2.5 cm), upper free end 50 is spaced about 1.0 inch (2.5 cm) from central portion 22.

It is apparent that the invention well achieves the stated objects and advantages and others.

The disclosed details are not to be taken as limitations on the invention except as those details are included in the appended claims.

What is claimed is:

1. A hanger hook of modified S shape all parts of which lie substantially in the same plane and formed of a rod and including a central portion having a lower end and an upper end, a lower open loop having a lower main arcuate portion joining said lower end of said central portion, a lower auxiliary arcuate portion of lesser radius than said lower main arcuate portion and joining said lower main arcuate portion and a lower straight portion joining said lower auxiliary arcuate portion and overlapping and spaced from said lower main arcuate portion and extending from said lower auxiliary arcuate portion toward said lower main arcuate portion to a lower free end of said hook, said lower free end spaced from said lower main arcuate portion, and an upper open loop having an upper main arcuate portion joining said upper end of said central portion, an upper auxiliary arcuate portion of lesser radius than said upper main arcuate portion and joining said upper main arcuate portion and an upper straight portion joining said upper auxiliary arcuate portion and overlapping and spaced from said upper main arcuate portion and extending from said upper auxiliary arcuate portion toward said upper main arcuate portion to an upper free end of said hook, said upper free end spaced from said upper main arcuate portion, and said lower and upper open loops lying on opposite sides of the line defined by said lower and upper ends of said central portion.

2. A hanger hook of modified S shape all parts of which lie substantially in the same plane, said hook formed of a cylindrical rod having a diameter of about 0.25 inch (0.6 cm) and having a substantially straight central portion having a lower end and an upper end, a lower open loop including a lower main arcuate portion smoothly joining said lower end of said central portion, a lower auxiliary arcuate portion smoothly joining said lower main arcuate portion and a lower straight portion smoothly joining said lower auxiliary arcuate portion and overlapping and spaced from said lower main arcuate portion and extending from said lower auxiliary arcuate portion to a lower free end of said hook, and an upper open loop including an upper main arcuate portion smoothly joining said upper end of said central portion, an upper auxiliary arcuate portion smoothly joining said upper main arcuate portion and an upper straight portion smoothly joining said upper auxiliary arcuate portion and overlapping and spaced from said upper main arcuate portion and extending from said upper auxiliary arcuate portion to an upper free end of said hook, said lower and upper open loops lying on opposite sides of the line defined by said central portion, wherein said upper auxiliary arcuate portion has an inside diameter of about 2.0 inches (5.1 cm) and said upper free end of said hook confronts said straight central portion and is spaced about 2.0 inches (5.1 cm) therefrom, and wherein said lower main arcuate portion and said upper auxiliary arcuate portion are externally tangential to a first vertical reference line and the center of curvature of said lower main arcuate portion is on a second vertical reference line which substantially passes through the midpoint of said straight central portion and the center of curvature of said upper main arcuate portion is on a third vertical reference line which is between said first and second reference lines and spaced about 0.3125 inch (0.8 cm) from said second vertical reference line.

3. A hanger hook of modified S shape all parts of which lie substantially in the same plane, said hook formed of a cylindrical rod having a diameter of about 0.25 inch (0.6 cm) and having a substantially straight central portion having a lower end and an upper end, a lower open loop including a lower main arcuate portion smoothly joining said lower end of said central portion, a lower auxiliary arcuate portion smoothly joining said lower main arcuate portion and a lower straight portion smoothly joining said lower auxiliary arcuate portion and overlapping and spaced from said lower main arcuate portion and extending from said lower auxiliary arcuate portion to a lower free end of said hook, and an upper open loop including an upper main arcuate portion smoothly joining said upper end of said central portion, an upper auxiliary arcuate portion smoothly joining said upper main arcuate portion and an upper straight portion smoothly joining said upper auxiliary arcuate portion and overlapping and spaced from said upper main arcuate portion and extending from said upper auxiliary arcuate portion to an upper free end of said hook, said lower and upper open loops lying on opposite sides of the line defined by said central portion, wherein said upper auxiliary arcuate portion has an inside diameter of about 2.0 inches (5.1 cm) and said upper free end of said hook confronts said straight central portion and is spaced about 2.0 inches (5.1 cm) therefrom, and wherein said straight central portion makes an angle of about 37 degrees with any said horizontal reference line, and wherein said lower straight portion makes an angle of about 30 degrees with any said horizontal reference line.

4. A hanger hook according to claim 1 wherein said upper auxiliary arcuate portion and said upper straight portion cooperate to form a portion of said upper open loop for receiving and holding a tree branch or the like, and said lower main arcuate portion, said lower auxiliary arcuate portion and said lower straight portion cooperate to form a bite for receiving thereover a circular portion of a hanger which is passable along said bite past said lower free end of said hook.

5. A hanger hook according to claim 4 wherein the maximum external transverse dimension of said bite is less than 1.5 inches (3.8 cm), thus to be able to receive thereover the circular portion of a hanger having an internal transverse dimension of about 1.5 inches (3.8 cm).

6. A hanger hook according to claim 5 wherein said maximum external transverse dimension is about 1.1875 inches (3.0 cm).

7. A hanger hook according to claim 1 wherein the minimum distance from said lower free end to said lower main arcuate portion is greater than 0.25 inch (0.6 cm).

8. A hanger hook according to claim 7 wherein the minimum distance from said lower free end to said lower main arcuate portion is about 0.5625 inch (1.4 cm).

9. A hanger hook according to claim 1 wherein said upper auxiliary arcuate portion has an inside diameter of about 2.0 inches (5.1 cm) and said upper free end of said hook confronts and is spaced about 2.0 inches (5.1 cm) from the upper end of said central portion.

10. A hanger hook according to claim 9 wherein said upper main arcuate portion is externally tangential to a first horizontal reference line and said upper straight portion lies externally on a second horizontal reference line spaced about 2.625 inches (6.7 cm) from said first horizontal reference line and said upper free end has a beveled surface generally confronting the upper end of said central portion.

11. A hanger hook according to claim 1 wherein said central portion is straight, said upper auxiliary arcuate portion has an inside diameter of about 1.5 inches (3.8 cm) and said upper free end of said hook confronts said straight central portion and is spaced about 1.5 inches (3.8 cm) therefrom.

12. A hanger hook according to claim 1 wherein said central portion is straight, said upper auxiliary arcuate portion has an inside diameter of about 1.0 inch (2.5 cm) and said upper free end of said hook confronts said straight central portion and is spaced about 1.0 inch (2.5 cm) therefrom.

13. A hanger hook according to claim 3 wherein said straight central portion has a length of about 3 inches (7.6 cm), the inside diameter of said lower main arcuate portion is about 3.75 inches (9.5 cm) and its arcuate extent is about 193 degrees, the inside diameter of said lower auxiliary arcuate portion is about 0.875 inch (2.2 cm) and its arcuate extent is about 160 degrees, the inside diameter of said upper main arcuate portion is about 4.25 inches (10.8 cm) and its arcuate extent is about 180 degrees.

* * * * *